United States Patent [19]
Münzinger

[11] 3,867,848
[45] Feb. 25, 1975

[54] ARCUATELY OSCILLATING PISTON MACHINE

[76] Inventor: Friedrich Münzinger, Hohenrandstrasse 46, 7 Stuttgart 80, Germany

[22] Filed: Nov. 6, 1973

[21] Appl. No.: 413,217

[30] Foreign Application Priority Data
Nov. 6, 1972 Germany.............................. 225423

[52] U.S. Cl............................ 74/70, 74/83, 74/36, 92/120, 417/481
[51] Int. Cl............................................ F16h 21/40
[58] Field of Search ............... 74/63, 43, 57, 36, 66, 74/65, 67; 308/3 CH; 417/481; 92/120

[56] References Cited
UNITED STATES PATENTS
248,524  10/1881  Stevens................................ 92/120

*Primary Examiner*—Wesley S. Ratliff, Jr.
*Attorney, Agent, or Firm*—Mason, Kolehmainen, Rathburn & Wyss

[57] ABSTRACT

A machine, related to that disclosed in U.S. Patent Application Ser. No. 338,652 in featuring a piston oscillation of under 360° about a piston shaft drivingly connected to a crankshaft by a linkage having a dead-centre position, is assisted through this position by an adjustable and positionable mass supported remote from the dead-centre position and acting on the articulation of the linkage with the piston shaft and crankshaft. The mass can be supported on an articulation between members of a rod assembly which itself acts on the articulation of the linkage with the two shafts.

8 Claims, 1 Drawing Figure

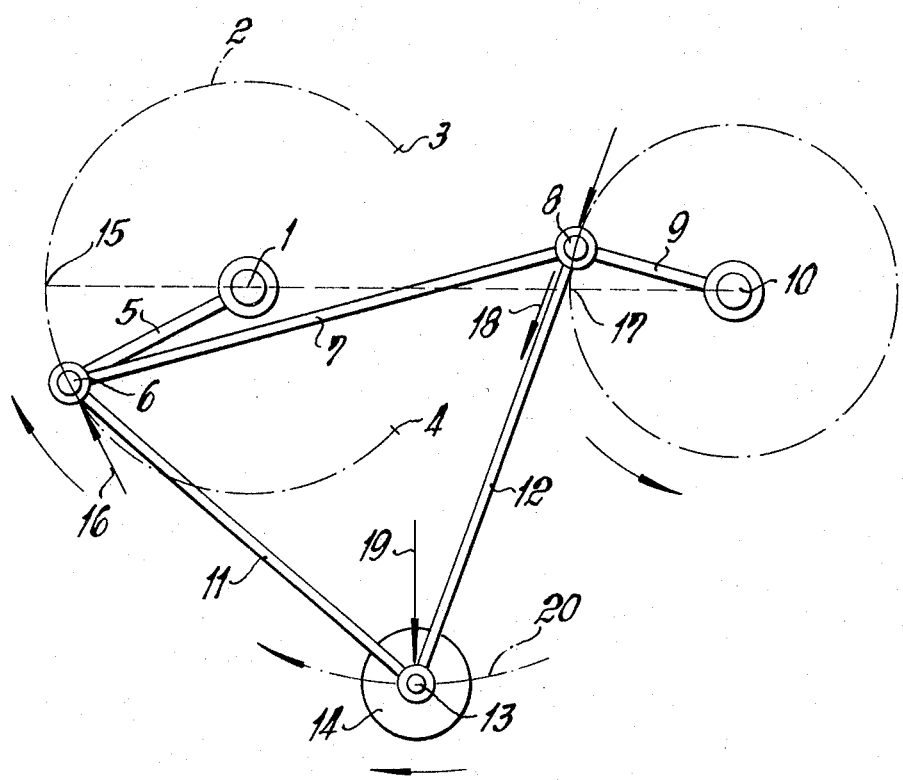

ARCUATELY OSCILLATING PISTON MACHINE

CROSS-REFERENCE TO RELATED APPLICATION

Application Ser. No. 388,652, filed by the present applicant on Mar. 7, 1973, discloses certain elements of the preferred embodiment of the present invention and is hereby incorporated by reference into the present application for all purposes. In particular, application Ser. No. 388,652 discloses the piston, cylinder, and crankshaft portions of an oscillating engine which portions are suitable for use in constructing the preferred embodiment of the present invention.

BRIEF SUMMARY OF THE INVENTION

This invention is concerned with a linkage transmission for an arcuately oscillating piston machine (i.e., motor or pump) having at least one piston which rotates with a piston shaft, drivingly interconnected with a crankshaft by the transmission which has a dead-centre position in its cycle of operation, in which position the transmission is least effective, the reversal points of the piston being separated in the arc of oscillation by an angle in excess of 180° and less than 360°. Such a machine is referred to herein as a machine of the kind stated. The crankshaft may rotate through 360°, and be interconnected with the piston shaft by a crank and a connecting rod.

In transmission known from French Pat. No. 914,008 the swing-through median (half-stroke) position of the piston occurs simultaneously with the dead-centre position of the crankshaft. This has the disadvantage that the connecting rod cannot effectively transmit power at that point, with the result that there is a correspondingly low peak output achievable with such transmissions.

A higher peak output can however be achieved if, as in my earlier proposal described in co-pending U.S. Pat. Application Ser. No. 338,652 filed Mar. 7, 1973, both the piston shaft and the crankshaft are each connected articulately to a rocking lever or bellcrank which is moved by connecting rod means connected to the respective cranks of the two shafts, and the corresponding articulation of the piston rod and of the connecting rod is so arranged that the crankshaft dead-centre synchronises with the median or half-stroke position of the piston.

Because inclusion of the rocking lever or bellcrank, compared to a direct connecting rod connection between piston shaft and crankshaft results in a large construction for the transmission, a means was sought to increase peak output in a different way, as is the case of transmissions having a direct connecting rod connection.

The present invention resides in the provision of a mass arranged to act on the transmission at least at the dead-centre position thereof in a manner tending to carry the transmission through the dead-centre position. By "driving" connection rod in this specification is meant the articulated connection between connecting rod and crank of the respective driving shaft, which can be either the piston shaft if the machine is a heat engine, or the crankshaft, if a compressor. Accordingly the dead-centre concerned will be either the swing-through median position of the piston, or the simultaneously occurring one dead-centre of the crankshaft. Moreover, the expressions "articulation" and "articulated" used herein imply only joints that permit movement.

For simplicity, reference is made herein to a "cylinder"; strictly this does not refer to a shape which is a volume of revolution of uniform radius about a straight axis, but to s chamber formed about an arcuate axis which functionally operates in the manner of a cylinder in a reciprocating engine. Moreover, the word "piston" is used herein to mean the sliding element which displaces or is displaced by the working fluid in such a cylinder, although this may well be more in the nature of a vane working in an arcuate chamber than an ordinary piston.

The mass mentioned is preferably a centrifugal weight which, up to reaching the relevant dead-centre of the driving connecting rod, will gather a certain amount of energy. In order that the mass by virtue of this gathered energy, may act to resolve forces, its centre of gravity will have to be defined, at least at that moment, at a position lying outside a straight line joining the connecting rod articulation with the piston shaft and with the crankshaft. This position may be a further articulation in an assembly of at least two rods jointed articulately to one another and to the connecting rod articulation with the piston shaft and with the crankshaft.

The resolution of forces must take place in regard to the driving force which acts approximately circumferentially in the relevant dead-centre of the driving connecting rod articulation; this driving force and the superimposition of the centrifugal force coming from the mass must give rise to a resultant force which will act upon the driven connecting rod articulation, which will be going through its dead-centre simultaneously. Consequently, the driven connecting rod articulation will be carried through (pushed/pulled) its dead-centre by a force which is directly dependent on the driving force, so that the driven shaft can deliver a correspondingly higher output.

DESCRIPTION OF THE PREFERRED EMBODIMENT

An embodiment, by way of example, of the present invention is shown schematically only, as a sectional representation in the accompanying diagram, because my previously mentioned Patent Application Ser. No. 388,652, filed on Mar. 7, 1973, which application is incorporated by reference into the present application for all purposes, may be referred to for the constructional details. Referring to the accompanying diagram, a piston shaft 1 of an arcuately oscillating piston machine is supported for rotation in the casing of the machine and is provided with at least one piston rigidly mounted on the piston shaft to rotate with it. The shaft 1 is oscillatable. Thus the piston sweeps in its operating cylinder which extends in the casing along an arcuate path 2 between limits 3 and 4, adjacent which are inlet and outlet ports and valves for controlled passage of the working fluid.

The limits 3 and 4 are separated by an angle of more than 180° and less than 360° for the purpose of achieving appropriate expansion or compression efficiencies dependent upon whether the machine is a heat engine or a compressor. The piston shaft 1 carries a cranking system therefor, which may be a crank 5 connected to a driving connecting rod 7 by a crank pin or an articulation 6. Connecting rod 7 is joined by a further articulation 8 with a crank 9 to a crankshaft 10, which is supported for rotation in the casing of the machine and positioned parallel to the piston shaft 1. When the machine is a heat engine, the piston shaft 1 is the driving shaft so that the connecting rod articulation 6 will in this instance constitute the driving articulation for the connecting rod articulation 8. When the machine is a compressor, the crankshaft 10 is the driving shaft and the connecting rod articulation 8 is the driving articulation for the connecting rod articulation 6. In other words the machine is completely reversible in sense of direction of its output (or input) drive. The linkage transmission between the piston shaft and crankshaft is appropriate to either case, in comprising the crank 5, articulation 6, driving connecting rod 7, articulation 8 and crank 9. The dead-centre position at which the linkage transmission is least effective in its cycle of operation occurs when the transmission is aligned with the straight, broken line in the diagram.

To the two connecting rod articulations 6 and 8 are secured articulation rods 11 and 12 which, at their outer extremities are connected together by a further articulation 13. On this further articulation is mounted a mass 14, which is remote from the line joining the articulations 6, 8 when such occupy their respective dead-centre positions 15, 17. The mass 14, for example in the dead-centre position or the swing-through median position 15 of connecting rod articulation 6, with the driving force acting circumferentially and indicated by the arrow 16, acts collectively on the piston shaft 1, crankshaft 10 and transmission (5 to 9) to resolve the forces, in order to carry the other connecting rod articulation 8 through its dead-centre position 17. The required tractive force, acting in the direction indicated by the arrow 18, results from the otherwise largely insignificant centrifugal force acting in the direction of arrow 19 being superimposed upon the mass 14, moving along path 20 through a dead-centre or swing-through median position 15, together with the driving force. The centrifugal force of the additional mass 14 is largely insignificant during the remaining phases of motion, because then the driving force is transmitted directly, by the connecting rod 7, to the articulation 8, which, however, is not possible at the swing-through median position 15, because here the connecting rod comes to lie in the same plane as the cranks 5 and 9 which otherwise resolve or distribute force.

The mass 14 could of course equally well be attached at another point of the articulated rod assembly, for instance to the articulated rod 11 at a point between the articulations 6 and 13, or to the articulated rod 12 between articulations 8 and 13.

It may furthermore be appropriate in some instances, to arrange for the mass 14 to be spring-mounted, that is to say, to secure it to the articulated rod assembly by a rubber mounting or other energy storage device so that at the swing-through median position of the driving connecting rod articulation a force is available, in addition to that of the actual centrifugal force of the mass 14. This is based on the consideration that the mass 14 is not continuously moved along path 20. Thus, during a deceleration phase, potential energy could be built up, and released kinetically in the acceleration phase during the run up to swing-through median position 15.

It is desirable, furthermore, to provide connecting means affording a plurality of positioning points at which the mass 14 can be secured, so that the effective distance of the mass from the driving connecting rod articulation can be selected. Furthermore, there may be a releasable connection between the mass and the articulations whereby the mass is exchangeable with an alternative mass. Reference should also be made to the possibility of forming or securing the mass 14 rigidly to be as one piece with the connecting rod 7, so as to form a single body, the centre of gravity fo which lies remote from the straight line joining the two connecting rod articulations 6 and 8. Such a single body, being as one with the connecting rod, will concentrate at its centre of gravity a certain amount of energy in a way similar to that of the mass 14 with its articulated rod assembly, which at the swing-through median position of the driving connecting rod articulation acts so as to resolve forces in respect to the driving force. With this embodiment in particular, consideration might be given to defining the body as a vessel with access means to its interior and containing liquid, when, especially for static installations, the amount of liquid could be adjusted in accordance with the number of revolutions and/or the driving force, for the sake of controlling peak output.

I claim:

1. An oscillating engine of the type having a piston that is connected to a pivotally-mounted piston shaft such that the shaft rocks coaxially with the piston over an angular range of between 180° and 360°, said engine also having a crankshaft mounted with its axis parallel to that of the piston shaft, and said engine including a linkage transmission drivingly connecting said crankshaft to said piston shaft, wherein the linkage transmission comprises:

a piston crank connected to and arranged to rock with the piston shaft;

a crankshaft crank connected to and arranged to rotate with the crankshaft;

a piston connecting rod having first and second ends hingedly connected at said first end to said piston crank and at said second end to said crankshaft crank, the length of said connecting rod and the spacing between said cranks being such that the linkage transmission passes through a position in a cycle of operation at which the mid-point of the piston in its arc of oscillation corresponds with one dead-center position of the piston crank and also with one dead-center position of the crankshaft crank; and a mass operatively attached to said connecting rod and disposed such that the center of gravity of the mass is remote from a line passing through the two hinge points of said piston connecting rod when the piston is at the mid-point of its arc of oscillation;

whereby the mass acts as a means resolving the driving and the driven forces which are present at the two hinge points when the piston swings through the mid-point of its arc of oscillation.

2. A machine according to claim 1, including a rod assembly comprising at least two rods and a third hinge point interconnecting them, the rod assembly being connected to the first and second hinge points and the mass being carried by the rod assembly.

3. A machine according to claim 2, in which the mass is at the third articulation.

4. A machine according to claim 2, in which an energy storage device is carried by the rod assembly, the mass is carried by the rod assembly by means of the device, the device being arranged to release stored energy at said dead-centre position in a manner tending to carry the transmission therethrough.

5. A machine according to claim 1, in which the mass and the driving connecting rod are as one rigid unit, the centre of gravity of which unit is disposed remote from the line joining the articulations at said dead-centre position.

6. A machine according to claim 1, including a releasable connection between the mass and the articulations whereby the mass is exchangeable.

7. A machine according to claim 1, including connecting means between the mass and the articulations, which connecting means afford a plurality of positioning points at which the mass can be secured and by which the distance of the mass from the articulations can be selected.

8. A machine according to claim 1, in which the mass is provided by a vessel containing liquid, access means being provided on the vessel to enable the quantity of liquid to be adjusted.

* * * * *